(12) United States Patent
Tanner

(10) Patent No.: US 11,076,095 B1
(45) Date of Patent: Jul. 27, 2021

(54) DEPTH SENSOR ASSISTED MULTIPLE IMAGER VIDEO SYSTEM

(71) Applicant: Altia Systems, Inc., Cupertino, CA (US)

(72) Inventor: Jason Daniel Tanner, Folsom, CA (US)

(73) Assignee: Altia Systems Inc., Cupertino, CA (US)

( * ) Notice: Subject to any disclaimer, the term of this patent is extended or adjusted under 35 U.S.C. 154(b) by 382 days.

(21) Appl. No.: 13/902,776

(22) Filed: May 24, 2013

Related U.S. Application Data

(60) Provisional application No. 61/652,060, filed on May 25, 2012.

(51) Int. Cl.
*H04N 5/232* (2006.01)
*G01B 11/22* (2006.01)

(52) U.S. Cl.
CPC ......... *H04N 5/23238* (2013.01); *G01B 11/22* (2013.01)

(58) Field of Classification Search
CPC ............. H04N 5/23238; H04N 5/2628; H04N 5/2259; G06T 3/4038; G02B 13/06; G01B 11/22
USPC .......................................................... 348/36
See application file for complete search history.

(56) References Cited

U.S. PATENT DOCUMENTS

| | | | | |
|---|---|---|---|---|
| 5,649,032 A * | 7/1997 | Burt | ...................... | G06K 9/32 348/588 |
| 2003/0234866 A1 * | 12/2003 | Cutler | ................... | G06T 5/008 348/207.1 |
| 2003/0235344 A1 * | 12/2003 | Kang | ...................... | G06K 9/32 382/284 |
| 2007/0206878 A1 * | 9/2007 | Liu | ................... | G06K 9/00228 382/276 |
| 2010/0097443 A1 * | 4/2010 | Lablans | ................ | G03B 37/00 348/36 |
| 2011/0158509 A1 * | 6/2011 | Li | ...................... | G06T 7/0028 382/154 |
| 2011/0316963 A1 * | 12/2011 | Li | ........................ | H04N 7/15 348/14.1 |
| 2012/0176473 A1 * | 7/2012 | Genova | ............. | H04N 13/0011 348/46 |
| 2012/0263397 A1 * | 10/2012 | Kimura | ................ | G06T 3/4038 382/284 |

* cited by examiner

*Primary Examiner* — Matthew K Kwan
(74) *Attorney, Agent, or Firm* — HM Law Group LLP; Vani Moodley, Esq.

(57) ABSTRACT

A computer-implemented method for a multiple imager imaging system is disclosed. The method comprises capturing regular images; capturing depth sensor images; and performing a depth-based alignment operation to adjust factory alignment parameters based on depth sensor information.

19 Claims, 4 Drawing Sheets

300

| Alignment distance | Merge Line Coordinates | Region of Overlap |
|---|---|---|
| 8' | P(i-4,j) | R1 |
| 12' | P(i,j) | R2 |
| 20' | P(i+2,j) | R3 |

DEPTH SENSOR ASSISTED MULTIPLE IMAGER VIDEO SYSTEM

This application claims the benefit of priority to U.S. Provisional Patent Application No. 61/652,060, which was filed on May 25 2012, the entire specification of which is incorporated herein by reference.

FIELD

Embodiments of the invention relate generally to multiple imager video systems that produce panoramic images through a process of stitching multiple images together.

BACKGROUND

Multiple imager video systems are capable of producing video with a wider field of view than conventional video systems. A key capability of a multiple sensor video system is to be able to align and stitch the multiple images together to form one cohesive scene. The more seamless the resultant video, the better the viewing experience for end users.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

In one aspect, there is provided computer-implemented method for a multiple imager imaging system. The method comprises capturing regular images; capturing depth sensor images; and performing a depth-based alignment operation to adjust factory alignment parameters based on depth sensor information.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
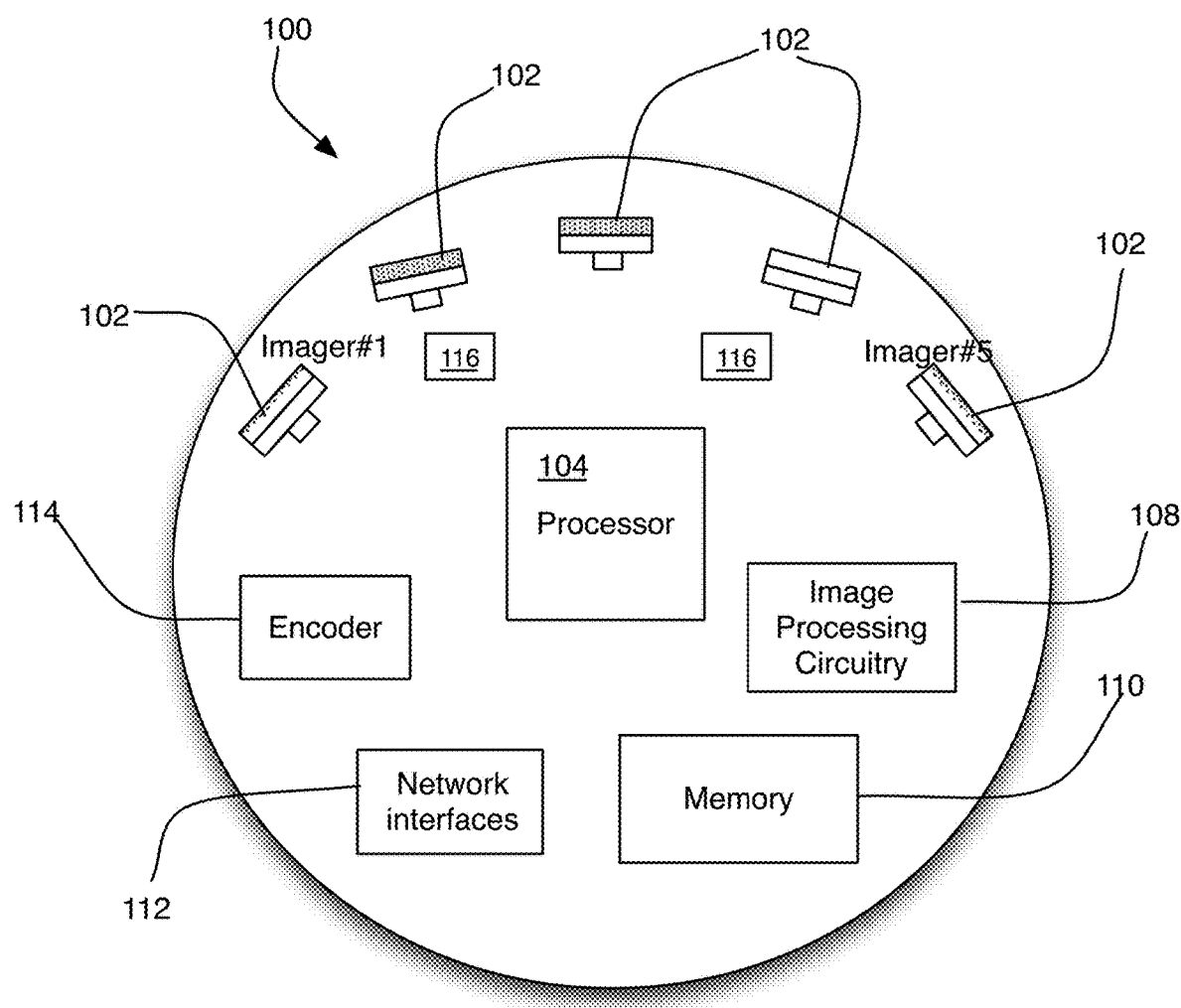
FIG. 1 illustrates a block diagram of a multiple imager imaging system, in accordance with to one embodiment of the invention.

FIG. 1 illustrates an example embodiment of an apparatus configured for generating panoramic images according to one embodiment of the invention, in the form of multiple imager video system (camera) 100.

The system 100 includes multiple imagers/sensors 102 mounted along an arc such that each imager 202 is directed to capture a portion of a scene. Each imager 102 may include suitable sensors, for example charge-coupled device (CCD) or complimentary metal-oxide semiconductor (CMOS) imaging sensors, as is known in the art.

The system 100 also includes logic/processor 104, image processing circuitry 106, memory 110, one or more network interfaces 110, and an encoder 112 In one embodiment, digital signals recorded by sensors 102 are sent to the logic/processor 104 for processing. In one embodiment, the logic/processor 104 may execute programs for implementing image processing functions and calibration functions, as well as for controlling the operation of the entire device 100 including its image capture operations. Optionally, the logic/processor 104 may include signal processing functionality for performing image processing, including image filtering, enhancement and for combining multiple fields of view in cooperation with the image processing circuitry 106, as will be explained in greater detail below. Although shown separately, in some embodiments, the image processing circuitry 106 may exist as part of the logic/processor 104. It is to be understood that components of the device 100 may take the form of hardware, software, firmware, or any combination of hardware, software, and firmware.

Digital signals representing a panoramic view may be stored in memory 110. The encoder 112 may compress digital signal before transmission across via a network interface 112. The network interfaces 112 may be configured to provide network connectivity to the device 100. As such, the network interfaces 112 may include wireless and wired interfaces, in accordance with different embodiments.

The camera 100 may include at least one time of flight or depth sensor 116. In the particular embodiment shown, two depth sensors 116 each covering a 100-degree field of view are used.

Each image sensor 102 captures a different portion of a scene to be imaged. When stitching together images from the imagers 102 it is important for objects across a seam align properly with minimal artifacts.

Embodiments of the present invention disclose using depth sensor information to when stitching images together thereby to ensure that artifacts due to stitching are non-existent or at least minimal.

Initial Calibration Across Multiple Distances

In one embodiment, an initial calibration operation may be performed based on a representative configuration of the system 100 in terms of the types of sensors, lenses, and other parameters such as the spacing between each imager.

In one embodiment, for the initial calibration operation a test setup representative of the system 100 may be set up at a test facility. Using the test setup, images (hereinafter, "test images") of a test scene may be taken at different distances between the test setup and the test scene.

Figure 3:
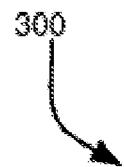
FIG. 3 shows a table of alignment parameters, in accordance with one embodiment of the invention.

In one embodiment, based on image analysis, a distance dependent alignment relationship between merge point/line, and region of overlap may be established. In one embodiment, as a result of the initial calibration, the system 100 may be provisioned with static or factory alignment parameters that specify a location for the merge point/line, the region of overlap, for each alignment distance. Said alignment parameters are optimal for a fixed distance, e.g. 12' to a scene being imaged as shown in FIG. 3 table 300 of the drawings.

Figure 4:
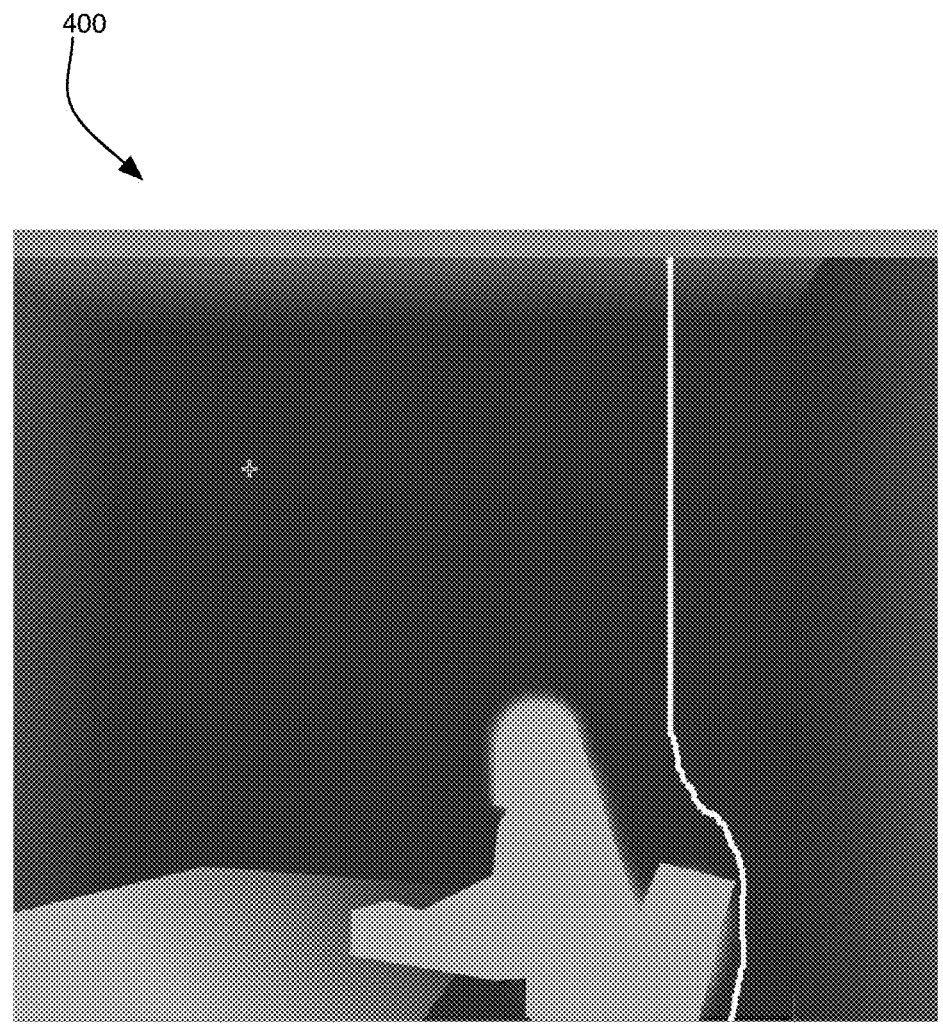
FIG. 4 shows a depth sensor image, in accordance with one embodiment of the invention.

FIG. 4 shows the alignment parameters 400 that may be stored in the memory 208 of the camera 200, in accordance with one embodiment of the invention. Referring to the alignment parameters 400, it will be seen that each imager 202 has a region of overlap R, an alignment distance, and a merge line (specified as coordinates P(i,j) relative to the region of overlap R). The alignment parameters 400 show are only for three alignment distances. In other embodiments, the alignment parameters may include many more distances. In some cases, only a few alignment parameters corresponding to only a few distances may be stored, however the camera 400 may be configured to calculate the alignment parameters for other distances based on the distance dependent alignment relationship.

Figure 2:
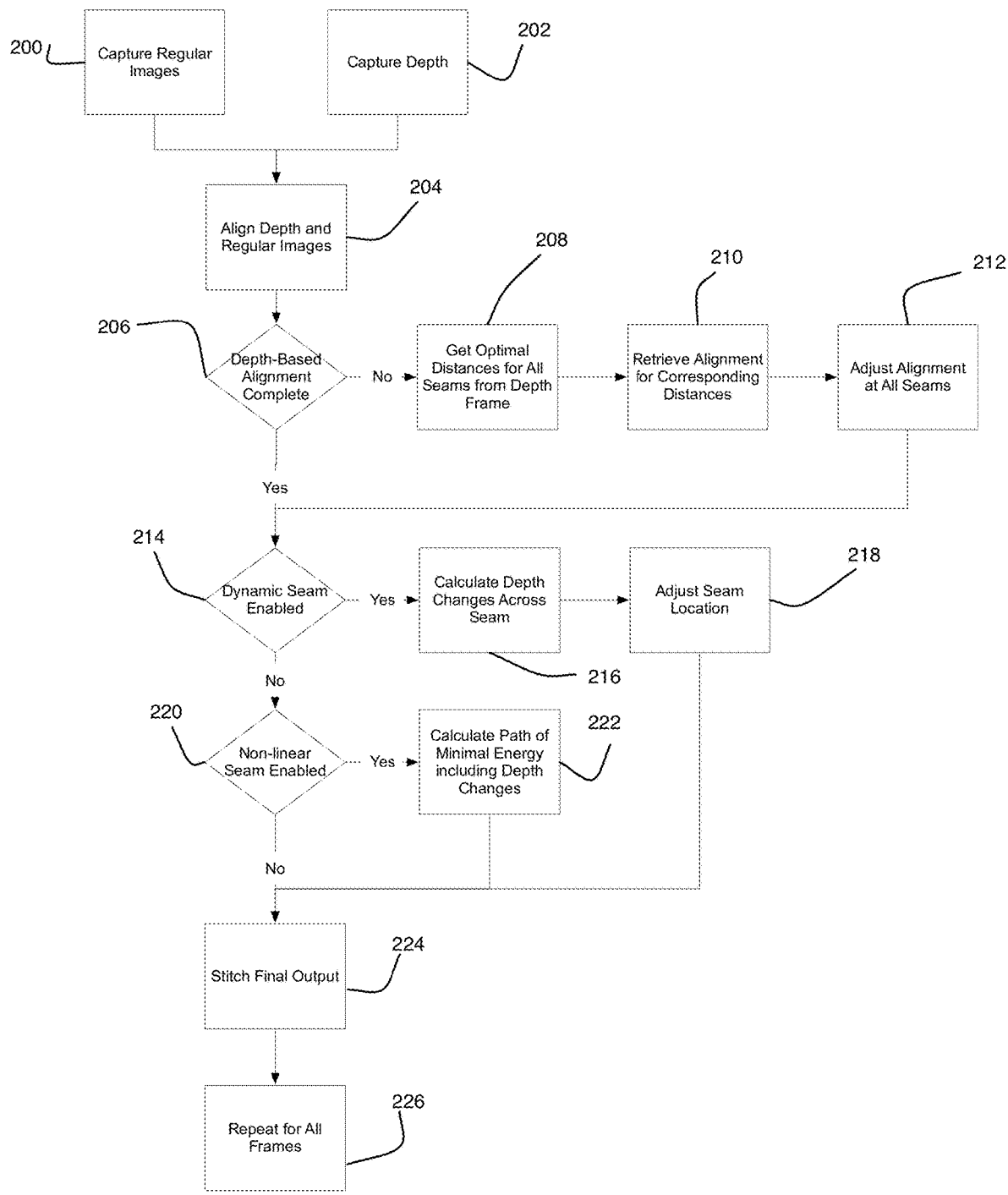
FIG. 2 shows a flowchart of a process for stitching images using depth sensor information, in accordance with one embodiment of the invention.

FIG. 2 shows a flowchart of operations performed by the camera 100, in accordance with one embodiment of the invention. Referring to FIG. 2, at block 200 regular images are captured by the imagers 102. At block 202, depth sensor images are captured with the depth sensors 116. At block 204 the regular images and the depth sensor images are synchronized or temporally aligned.

In one embodiment, the camera 100 may be provisioned with default or factory alignment parameters that are stored in the memory 110. As is described in co-pending U.S. patent application Ser. No. 13/902,370, which is hereby incorporated herein by reference, the factory alignment parameters specify a location for the merge point/line, the region of overlap, for each alignment distance. Said alignment parameters are optimal for a fixed distance, e.g. 12' to a scene being imaged. FIG. 4 shows the alignment parameters 400 that may be stored in the memory 108 of the camera 100, in accordance with one embodiment of the invention. Referring to the alignment parameters 300, it will be seen that each imager 102 has a region of overlap R, an alignment distance, and a merge line (specified as coordinates P(i,j) relative to the region of overlap R). The alignment parameters 300 show are only for three alignment distances. In other embodiments, the alignment parameters may include many more distances. In some cases, only a few alignment parameters corresponding to only a few distances may be stored, however the camera 100 may be configured to calculate the alignment parameters for other distances based on the distance dependent alignment relationship between the region of overlap R, the merge line, and the position of each image being merged relative to an image capture area of canvas.

In one embodiment the camera 100 may be configured to use the depth information provided by the depth sensors 116 to override the factory alignment parameters, a process referred to herein as "depth-based alignment". For this embodiment, the camera 100 first checks (see block 206 in FIG. 2) if the depth-based alignment has been completed. If the depth-based alignment has not been completed then blocks 208-212 are executed to complete the process of depth-based alignment, in accordance with one embodiment. At the block 208, each depth frame captured by the depth sensors 116 is used to get optimal distances for the corresponding regular frames. At the block 210, the alignment parameters for the distances indicated by the depth frame sensors 116 are retrieved from the memory 110. In one embodiment, said alignment parameters may be calculated based on the distance dependent alignment relationship. At the block 212, to complete the depth-based alignment, the all seams between the images captured by imagers 102 are adjusted/recalibrated based on the retrieved/calculated alignment parameters. The check performed at block 216 essentially ensures that the depth-based alignment is performed once each time the camera 100 is turned on.

In another embodiment, a room is measured to have depth at different points. The uniformity of the depth may be measured by calculating how many pixels are within a close margin of different distances. The spatial complexity of the scene that has uniform representation in the scene may be computed by performing an edge detection and summing the edges within the distances. The portion of the scene with significant representation and greater spatial complexity may be used to determine the alignment distance for each seam. The more complicated parts of the scene will align properly and the less complicated parts will show less visual artifacts since their complexity is low.

In another embodiment, the depth of moving objects may be used to adjust the alignment. Checking motion vectors from the encoder or finding frames with minimal change from frame to frame may determine the object movement. It is common in videoconference and other applications that the object of most interest is the object closest to the camera. Thus once the moving objects are determined, their distance can be used for alignment. The objects that move may produce more noticeable visual artifacts than misaligned static background in some applications.

In another embodiment, a face may be detected in the scene. The depth of that face is retrieved from the depth image. The nearest seams may be adjusted to have the alignment at that depth. For videoconference, people may sit or stand around a table at a fixed distance. Thus using the distance for the participants in the videoconference may be used to improve the viewing experience of the individuals in the room.

Co-pending U.S. patent application Ser. No. 13/902,186, which is incorporated herein by reference in its entirety, discloses techniques for dynamically adjusting a location of a seam within the region of overlap between two images being stitched. Accordingly, the image processing circuitry may include a block to perform a dynamic seam adjustment in accordance with the techniques disclosed in U.S. patent application Ser. No. 13/902,186. Further, in one embodiment, the camera 100 may include a control to selectively enable or disable the dynamic seam adjustment block.

Thus, at block 214, the camera 100 checks if the dynamic seam adjustment block has been enabled. If dynamic seam adjustment block has been enabled, then the blocks 216 and 218 are executed to perform the dynamic seam adjustment, in accordance with one embodiment. At the block 216, the camera 100 calculates depth changes across each seam using depth information from the depth sensors 216. At the block 218, said seam is adjusted based on any depth changes that were detected at the block 216.

Co-pending U.S. patent application Ser. No. 13/902,248, which is incorporated herein by reference in its entirety, discloses techniques for minimizing visual artifacts in images due to stitching by computing a non-linear seam based on minimizing a cost function indicative of temporal and spatial distortions along a seam. Accordingly, the image processing circuitry 108 may include a block to perform a non-linear seam adjustment in accordance with the techniques disclosed in U.S. patent application Ser. No. 13/902,248 modified to use depth information from the depth sensors 116 as explained below. Further, in one embodiment, the camera 100 may include a control to selectively enable or disable the non-linear seam adjustment block.

For the nonlinear seam, the equation for distortion may be optimized with the addition of a new cost in the Dist(i,j) equation.

$$\text{Dist}(i,j) = \alpha * \text{Spatial}(i,j) + \beta * \text{Temporal}(i,j) + \delta * \text{Composite}(i,j) + \gamma * \text{Depth}(i,j)$$

Further, the equation for Depth(i j) may set as the following:

$$\text{Depth}(i,j) = \max(\text{Distance}_{left}(i,j) - \text{Alignment\_Distance}, \text{Distance}_{right}(i,j) - \text{Alignment\_Distance}$$

The cost for a pixel increases as it is further from the alignment distance that is being used. Adding the costing for depth makes the seam more likely to traverse a path close to the current alignment. The closer to the target alignment distance, the less visual artifacts would be produced.

At block 220, the camera 100 checks if non-linear seam adjustment block is enabled. If it is then, at block 222, the camera 100 calculated the least cost/energy path for the seam based on the above equations. Referring to FIG. 4 of the drawings, reference numeral 400 generally indicates a depth image of a person sitting at a conference table. In the depth image 400 dark areas are further from the camera 100 than light areas. A seam (shown as a white line) extends through the image 400 from top to bottom. Near the top, the seam is linear, but in the region of the image corresponding to the person the seam becomes non-linear where it effectively curves around the person. This is to avoid the person because the person is closer to the camera than other objects (back wall of room) in the image 400. The non-linear seam represents the minimal energy path for the seam.

At block 224, the final blended images are stitched and the process is repeated for all frames at block 226.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method, comprising:
   capturing regular images of a scene by a multi-imager camera including an array of imagers mounted along an arc;
   capturing depth sensor images of the scene by a plurality of depth sensor imagers;
   performing a depth-based alignment operation on the regular images to override a factory alignment parameter based on depth sensor information which is determined from the depth sensor imagers,
   wherein the factory alignment parameter corresponds to a predefined distance dependent alignment relationship between a seam and a region of overlap of images captured at a plurality of predefined distances between the plurality of imagers and the scene being captured; and
   performing a non-linear seam calculation to calculate a minimal cost path for the seams at a current seam location calculated based on the depth sensor information wherein the factory alignment parameter includes the region of overlap, the predefined alignment distance and the seam location corresponding to the region of overlap.

2. The method of claim 1, further comprising temporally aligning the regular images with the depth sensor images.

3. The method of claim 2, further comprising performing a dynamic seam adjustment operation to adjust a location of each seam based on depth changes detected across the seams based on the depth sensor information.

4. The method of claim 1, wherein the minimal cost path is based on minimizing spatial, temporal, and composite distortions.

5. The method of claim 4, further comprising adjusting the current seam based on the minimal cost path so that portions of said current seam are made non-linear.

6. The method of claim 1, wherein the depth-based alignment operation is performed without human-input.

7. A multiple imager system comprising an imaging processing circuitry, configured to:
   capture regular images of a scene by an array of imagers mounted along an arc on a camera;
   capture depth sensor images of the scene by a plurality of depth sensor imagers;
   perform a depth-based alignment operation on the regular images to override a factory alignment parameter based on depth sensor information which is determined from the depth sensor imagers,
   wherein the factory alignment parameter corresponds to a predefined distance dependent alignment relationship between a seam and a region of overlap of images captured at a plurality of predefined distances between the camera and the scene being captured; and
   perform a non-linear seam calculation to calculate a minimal cost path for the seam at a current seam location calculated based on the depth sensor information wherein the factory alignment parameter includes the region of overlap, the predefined alignment distance and the seam location corresponding to the region of overlap.

8. The system of claim 7, is further configured to temporally align the regular images with the depth sensor images.

9. The system of claim 8, is further configured to perform a dynamic seam adjustment operation to adjust a location of each seam based on depth changes detected across the seams based on the depth sensor information.

10. The system of claim 7, wherein the minimal cost path is based on minimizing spatial, temporal, and composite distortions.

11. The system of claim 10, is further configured to adjust the current seam based on the minimal cost path so that portions of said current seam are made non-linear.

12. The system of claim 7, wherein the depth-based alignment operation is performed without human-input.

13. The system of claim 7, includes two depth sensor imagers, wherein each of the depth sensors covers a 100 degree field of view.

14. The system of claim 7, wherein the depth-based alignment operation on the regular images corresponds to re-calculation of alignment parameters including a region of overlap, an alignment distance and a seam location relative to the region of overlap of the camera.

15. A non-transitory computer-readable medium having stored thereon a sequence of instructions which when executed by a system causes the system to perform a method for a multiple imager system, comprising:
   capturing regular images of a scene by an array of imagers mounted along an arc on a camera;
   capturing depth sensor images of the scene by a plurality of depth sensor imagers;
   performing a depth-based alignment operation on the regular images to override a factory alignment parameter based on depth sensor information which is determined from the depth sensor imagers,
      wherein the factory alignment parameter corresponds to a predefined distance dependent alignment relationship between a seam and a region of overlap of images captured at a plurality of predefined distances between the plurality of imagers and the scene being captured; and
   performing a non-linear seam calculation to calculate a minimal cost path for the seams at a current seam location calculated based on the depth sensor information wherein the factory alignment parameter includes the region of overlap, the predefined alignment distance and the seam location corresponding to the region of overlap.

16. The computer-readable medium of claim 15, wherein the method further comprises temporally aligning the regular images with the depth sensor images.

17. The computer-readable medium of claim 16, wherein the method further comprises performing a dynamic seam adjustment operation to adjust a location of each seam based on depth changes detected across the seams based on the depth sensor information.

18. The computer-readable medium of claim 17, wherein the minimal cost path is based on minimizing spatial, temporal, and composite distortions.

19. The computer-readable medium of claim 18, wherein the method further comprises adjusting based on the minimal cost path the current seam so that portions of said current seam are made non-linear.

\* \* \* \* \*